July 18, 1944.    A. KECK ET AL    2,353,672
PHASE INVERTER
Filed July 28, 1942
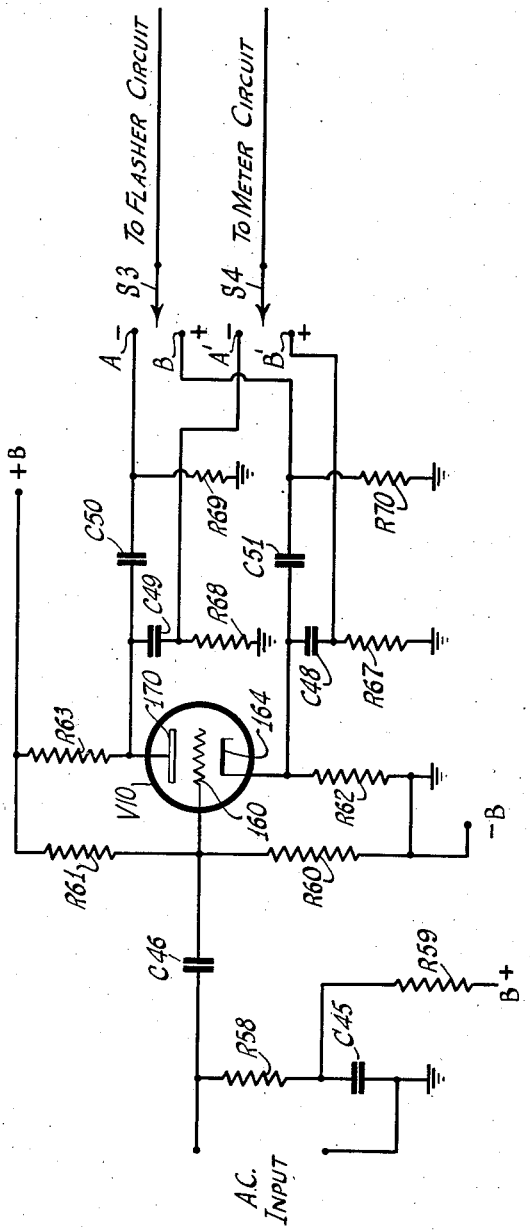
INVENTOR.
ALFRED KECK
JOHN M. BRUMBAUGH.
BY
H.S.Grover
ATTORNEY Patented July 18, 1944

2,353,672

UNITED STATES PATENT OFFICE 2,353,672

PHASE INVERTER

Alfred Keck, Hyde Park, Mass., and John M. Brumbaugh, Lansdowne, Pa., assignors to Radio Corporation of America, a corporation of Delaware Application July 28, 1942, Serial No. 452,608

4 Claims. (Cl. 172—238)

This application concerns a new and improved voltage or potential phase inverter by means of which voltages or potentials of opposed phase but which are otherwise substantially identical may be derived from single phase voltages or other potentials. The novel means of this application is of general application in the radio and associated arts. A particular use therefor is in the frequency modulated wave analyzer of John M. Brumbaugh's U. S. application Serial #447,629, filed June 19, 1942.

In describing our invention a phase inverter arrangement as disclosed in the said application will be used, and this phase inverter has been illustrated in the single figure of the drawing.

Referring to the figure of the drawing, a voltage or potential, the phase of which is to be inverted or reversed, is supplied at the connectors marked AC Input and appears across a resistance R58, which is connected by a condenser C45 to ground. The potential here may represent, for example, the modulations derived by demodulating a wave length modulated wave or other potentials of this general nature. The resistance R58 may be any input resistance and may, for example, also be the output resistance of a preceding stage as in said application. The potential is applied by coupling condenser C46 to the control grid 160 of the tube V10. Control grid 160 is coupled to its cathode 164 by a resistance R60 and a self-biasing degenerative resistance R62, which also is an output resistance or load. The control grid 160 is also connected by a relatively high resistance R61 to the positive terminal of a source of potential, the negative terminal of which is connected to the ground end of R62. The anode 170 of tube V10 is connected by a resistance R63 to the positive terminal of the source, this resistance R63 serving as a load or output resistor for the tube. The potential drop between the anode end of resistor R63 and ground is supplied by coupling condensers C49 and C50 to two output connections, A and A'. These output connections also include filter resistors R68 and R69. The resistor R62 is also coupled by condensers C48 and C51 to the two output terminals labeled B and B'.

R58 is the plate load resistor of the preceding stage. The voltage from this stage is coupled to the phase inverter through capacitor C46. C45 and R59 comprise a decoupling filter. The control grid biasing potential is supplied by the voltage divider composed of the resistances R60 and R61. This biasing voltage is positive with respect to ground. The sum of this potential and the voltage drop across R62, due to the quiescent plate current flowing through R62, obtains the correct operating control-grid potential for the tube V10. R62 and R63 together compose the total load resistance of the tube V10.

Since the cathode and plate are of opposite alternating potential with respect to ground, these points are used to obtain the output voltages or potentials which are alike except for phase.

Theoretically R62 and R63 should be equal, but because of unequal shunting effects of the external circuit, R63 is made slightly lower in resistance value than R62. This makes the alternating voltage from plate 170 to ground equal to that from cathode 164 to ground.

Capacitors C48 and C49 are coupling capacitors to two output connections, such as, for example, connections to the diode in the meter circuit of the said above identified application; while R67 and R68 are ground return resistors. Similarly, C50 and C51 are coupling capacitors for two other output connections, such as, for example, connections to the flasher circuit and R69 and R70 are the grid resistors for the flasher input circuit of the said above identified application.

The applied voltage or potential is reversed in phase by the tube action so that the voltage or potential on the anode 170 is reversed with respect to the voltage or potential to the grid 160. The voltage in R62, however, is in phase with the applied grid voltage. Thus, if we take the output from the anode resistor R63, we will have a potential corresponding to the applied potential but of opposed phase. This potential appears at the points marked A and A'. If we take the output from the cathode resistor, R62, we have a potential identical to the potential derived from R63, but of the same phase as the potential or voltage impressed on grid 160. This latter potential appears at the connectors marked B and B'.

In this reverser arrangement, as shown, the full cathode bias resistor R62 drop is supplied to the control grid 160. This provides a negative bias thereon which may be too high and then to compensate this high negative potential, some positive potential is supplied to the control grid by resistor R61. Thus, the voltages or potentials of reversed phase are obtained from balanced resistors R62 and R63 in the plate and cathode of the same tube and the potentials or voltages must be identically equal in magnitude since they are produced by the same current flowing in substantially matched resistors. Note that the resistors R62 and R63 may not be exactly equal because of reasons pointed out hereinbefore. Thus, the voltage path in our system is independent of tube gain. In arrangements known heretofore, the bias has been arranged by means of a tap on the cathode resistor, and this gives full cathode degeneration only if the grid is driven from an impedance which is quite low compared to the grid resistor. The bleeder bias method of the present invention gives full degeneration with a high impedance source. It also tends to maintain a more stable operating point on the tube characteristic. As is well known, many phase inverters of the prior art use two tubes and, as a consequence, are subject to changes of current due to changes in the two tube characteristics. Here a fundamental requirement is that the impressed voltages give phase reversed voltages identically equal in magnitude and the arrangement shown meets this requirement.

When the phase inverter of our invention is used in a monitor of the nature described in the above identified application, the points A and B may be connected by switch S3 to a flasher circuit; while the points A' and B' may be connected by a switch S4 to a meter circuit.

In other uses one output connection to each of the output impedances only is used.

In an arrangement which operated satisfactorily to handle potentials of modulation frequency the tube V10 was a 6J5, and the circuit elements were as follows:

| | | |
|---|---|---|
| R58 | ohms | 180,000 |
| C45 | microfarads | 10 |
| R59 | ohms | 33,000 |
| C46 | microfarads | .25 |
| R60 | megohms | 1.2 |
| R61 | do | 5.6 |
| R62 | ohms | 27,000 |
| R63 | do | 27,000 |
| R64 | do | 680,000 |
| R67 | do | 560,000 |
| R69 | megohms | 1 |
| R70 | do | 1 |
| C48 | microfarads | .25 |
| C49 | do | .25 |
| C50 | do | .1 |
| C51 | do | .1 |

We claim:

1. In apparatus for producing two substantially identical phase opposed potentials which correspond to a first potential, a tube having an electron receiving electrode, a control electrode and a cathode, connections for impressing said first potential on said control electrode and cathode, a source of direct current, two output impedances one connected to the cathode and one connected to the electron receiving electrode, a connection for impressing the potential drop in the impedance connected to the cathode on the control electrode, and a connection for impressing an opposing potential from said source of direct current on the control electrode of said tube, whereby one of said two substantially identical but phase opposed potentials appears in said impedance connected to the electron receiving electrode and the other of said two substantially identical but phase opposed potentials appears in the impedance connected to the cathode of said tube.

2. In apparatus for producing two substantially identical phase opposed potentials which correspond to a first potential, a tube having an electron receiving electrode, a control electrode and a cathode, a source of direct current, two output impedances one connected between the cathode of said device and ground and one connected between the electron receiving electrode and ground, a connection for impressing the potential drop in the impedance connected between the cathode and ground on the control electrode of said device, a connection for impressing an opposing direct current potential from said source of direct current on the control electrode of said tube, and means for impressing said first potential on the control grid and cathode of said device whereby one of said two substantially identical but phase opposed potentials appears in said impedance connected between the electron receiving electrode and ground and the other of said two substantially identical but phase opposed potentials appears in the impedance connected between the cathode of said tube and ground.

3. In a system for deriving from alternating current of a given phase, substantially equal alternating currents of opposed phase, an electron discharge device having a control grid, an anode, and a cathode, connections for impressing said alternating current on the control grid and cathode of said device, a source of direct current potential, a resistive potentiometer connected across said source of direct current potential, said potentiometer including a resistance between the control grid and positive terminal of said source and a resistance between the control grid and negative terminal of said source, an output impedance connected to the anode of said device, and an output impedance connected between the cathode of said device and the negative terminal of said source.

4. In a potential reverser an electron discharge device having a control grid, an anode, and a cathode, a source of direct current potential, an output impedance connected between the cathode of said device and the negative terminal of said source, a connection between the grid of said device and the terminal of said output impedance remote from said cathode, connections for impressing said potential between the control grid of said device and ground, and the said terminal of said resistance, an impedance connecting the anode of the device to the positive terminal of said source, an output impedance connected to the anode of said device, an output circuit connected to said last named impedance, and an output circuit connected to the impedance connecting the cathode of said device to the negative terminal of said source.

ALFRED KECK.
JOHN M. BRUMBAUGH.